US011524769B1

(12) United States Patent
Kuker

(10) Patent No.: US 11,524,769 B1
(45) Date of Patent: Dec. 13, 2022

(54) WIRELESS CABIN CONTROL PANELS

(71) Applicant: Rockwell Collins, Inc., Cedar Rapids, IA (US)

(72) Inventor: Anthony Kuker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 366 days.

(21) Appl. No.: 16/795,165

(22) Filed: Feb. 19, 2020

(51) Int. Cl.
*B64C 19/00* (2006.01)
*B64D 43/00* (2006.01)

(52) U.S. Cl.
CPC .............. *B64C 19/00* (2013.01); *B64D 43/00* (2013.01)

(58) Field of Classification Search
CPC .......... B64D 11/0624; B64D 11/00152; B64D 11/00155; G06F 1/16; Y02T 50/40; B32B 2369/00; B32B 2405/00
See application file for complete search history.

(56) References Cited

U.S. PATENT DOCUMENTS

| 8,164,215 | B2 | 4/2012 | Bauer et al. | |
|---|---|---|---|---|
| 8,482,250 | B2 | 7/2013 | Soar | |
| 8,594,572 | B1 | 11/2013 | Ortiz et al. | |
| 9,608,455 | B2 | 3/2017 | Byrne et al. | |
| 9,887,586 | B2 | 2/2018 | Schomacker | |
| 2009/0112638 | A1* | 4/2009 | Kneller .................. | G06Q 10/00 705/5 |
| 2013/0167817 | A1* | 7/2013 | Bauer ................. | B64D 11/0624 123/621 |
| 2014/0179212 | A1* | 6/2014 | Space .................. | B60N 2/5635 454/76 |
| 2014/0269886 | A1* | 9/2014 | Plumb ................. | H03M 13/152 375/232 |
| 2015/0006395 | A1* | 1/2015 | Chu ....................... | G06Q 50/06 705/44 |
| 2015/0061587 | A1* | 3/2015 | Bruechmann ........ | H04B 5/0037 320/108 |

(Continued)

FOREIGN PATENT DOCUMENTS

KR          20190109808 A       9/2019

OTHER PUBLICATIONS

WiTricity, https://witricity.com/faq/, Printed Dec. 13, 2019, 4 pages.

*Primary Examiner* — William Lu
(74) *Attorney, Agent, or Firm* — Suiter Swantz pc llo

(57) ABSTRACT

A wireless aircraft cabin control panel is disclosed. In embodiments, the wireless aircraft cabin control panel includes a user interface device disposed on a first surface of a bulkhead of an aircraft cabin. In embodiments, the user interface includes a display device, a user input device, wireless communication circuitry, and a controller. The controller may be configured to: generate control signals configured to cause the wireless communication circuitry to transmit wireless control signals to wireless communication circuitry of a control unit disposed on a second surface of the bulkhead; receive power via wireless charging signals received from the wireless communication circuitry of the control unit; distribute power from the wireless charging signals to the display device; extract data signals encoded within the wireless charging signals; and cause the display device to display at least one of an indicator or an image in response to the extracted data signals.

14 Claims, 4 Drawing Sheets

(56) References Cited

U.S. PATENT DOCUMENTS

| | | | | |
|---|---|---|---|---|
| 2015/0126177 A1* | 5/2015 | Bauer | ............... | H04M 1/72454 |
| | | | | 455/420 |
| 2016/0059954 A1* | 3/2016 | Fagan | ............. | B64D 11/00153 |
| | | | | 701/3 |
| 2016/0152340 A1* | 6/2016 | Bauer | ............... | B64D 11/0015 |
| | | | | 297/217.3 |
| 2016/0249073 A1* | 8/2016 | Margis | ............... | B64D 11/0638 |
| 2017/0101187 A1* | 4/2017 | Noske | ............... | B64D 11/0015 |
| 2017/0149265 A1* | 5/2017 | Huang | .................. | E05B 47/00 |
| 2018/0093772 A1* | 4/2018 | Walker | .................... | H02J 50/10 |
| 2018/0186456 A1* | 7/2018 | Hess | ................. | B64D 11/0624 |
| 2018/0241250 A1* | 8/2018 | Kahlman | ............. | H04B 5/0012 |
| 2018/0317071 A1* | 11/2018 | Rabii | ................. | H04W 12/50 |
| 2018/0351373 A1* | 12/2018 | Behzadi | ............. | G06F 3/04817 |
| 2019/0027972 A1* | 1/2019 | Gietzold | ................ | H02J 7/025 |
| 2019/0077524 A1* | 3/2019 | Faber | ................... | B64C 39/024 |
| 2019/0157905 A1* | 5/2019 | Zurian | .................. | B64D 47/00 |
| 2019/0184842 A1* | 6/2019 | Waters | .................. | H02J 50/40 |
| 2020/0130846 A1* | 4/2020 | Mayne | ............... | B64D 11/0643 |
| 2020/0148366 A1* | 5/2020 | Fagan | ............... | B64D 11/0619 |
| 2020/0216176 A1* | 7/2020 | Ma | ..................... | B64D 11/0015 |
| 2020/0228337 A1* | 7/2020 | Sumien | ................ | H04L 9/3268 |
| 2020/0235597 A1* | 7/2020 | Hakla | ................. | B64D 11/0624 |
| 2020/0339259 A1* | 10/2020 | Waters | .................. | B60L 53/124 |
| 2020/0343775 A1* | 10/2020 | Yahagi | ................... | H02J 50/10 |
| 2021/0037645 A1* | 2/2021 | Levesque | ............... | B64C 1/066 |

\* cited by examiner

WIRELESS CABIN CONTROL PANELS

BACKGROUND

Modern aircraft cabins include a number of control panels configured to control various aspects of the aircraft cabin, including lights, flight attendant controls, passenger entertainment units, passenger environment control units (e.g., air nozzles), and the like. Typically, these control panels are disposed on/within bulkheads of the aircraft cabin, which require holes to be cut within the bulkheads in order for the various wires, cables, and controllers of the control panels to be disposed and/or routed through the bulkhead. However, many aircraft include bulkheads made of expensive materials and/or elaborate woodwork. This is especially the case in private jets and first-class commercial cabins. In this context, cutting holes within the bulkheads to provide for these control panels may destroy portions of the bulkheads, and reduce aesthetic appeal of the aircraft cabin. Therefore, it would be desirable to provide a system and method that cure one or more of the issues identified above.

SUMMARY

A wireless aircraft cabin control panel is disclosed. In embodiments, the wireless aircraft cabin control panel includes a user interface device disposed on a first surface of a bulkhead of an aircraft cabin. In embodiments, the user interface includes a display device, a user input device, wireless communication circuitry, and a controller. The controller may be configured to: generate one or more control signals configured to cause the wireless communication circuitry to transmit one or more wireless control signals to wireless communication circuitry of a control unit disposed on a second surface of the bulkhead opposite the first surface; receive power via wireless charging signals received from the wireless communication circuitry of the control unit; distribute power from the wireless charging signals to the display device; extract one or more data signals encoded within the wireless charging signals; and transmit one or more control signals to the display device in response to the one or more extracted data signals, the one or more control signals configured to cause the display device to display at least one of an indicator or an image.

In some embodiments of the wireless aircraft cabin control panel, the wireless communication circuitry of the user interface device and the wireless communication circuitry of the control unit are communicatively coupled via an inductive coupling.

In some embodiments of the wireless aircraft cabin control panel, the power is inductively transferred via the wireless charging signals from the wireless communication circuitry of the control unit to the wireless communication circuitry of the user interface device.

In some embodiments of the wireless aircraft cabin control panel, the wireless communication circuitry of the user interface device and the wireless communication circuitry of the control panel include inductive transceiving coils.

In some embodiments of the wireless aircraft cabin control panel, the user interface further includes power supply circuitry electrically coupled to the display device and the controller, wherein the power supply circuitry is configured to distribute the power received via the wireless charging signals to the display device and the controller.

In some embodiments of the wireless aircraft cabin control panel, the power supply circuitry includes a rechargeable battery configured to store power.

In some embodiments of the wireless aircraft cabin control panel, the controller is configured to generate the one or more control signals configured to cause the wireless communication circuitry to transmit one or more wireless control signals in response to one or more input commands received via the user input device.

In some embodiments of the wireless aircraft cabin control panel, the control unit is communicatively coupled to one or more external devices, and the one or more wireless control signals transmitted from the controller of the user interface device to the control unit are configured to selectively modify one or more characteristics of the one or more external devices.

In some embodiments of the wireless aircraft cabin control panel, the one or more external devices include at least one of an aircraft passenger control unit or an aircraft personnel device.

In some embodiments of the wireless aircraft cabin control panel, the aircraft passenger control unit includes at least one of a passenger light or a passenger air flow unit.

In some embodiments of the wireless aircraft cabin control panel, the user input device includes at least one of a touchscreen, a button, a dial, or a switch.

In some embodiments of the wireless aircraft cabin control panel, the one or more wireless control signals transmitted by the wireless communication circuitry of the user interface device via an inductive coupling.

In some embodiments of the wireless aircraft cabin control panel, the one or more wireless control signals transmitted by the wireless communication circuitry of the user interface device comprise at least one of a low-power Bluetooth signal or a WiFi signal.

In some embodiments of the wireless aircraft cabin control panel, the control unit is disposed within the bulkhead of the aircraft cabin.

A method for operating a wireless aircraft cabin control panel is disclosed. In embodiments, the method includes: inductively transferring power from a control unit of a wireless aircraft cabin control panel through a bulkhead of an aircraft cabin to a user interface device via one or more wireless charging signals; encoding one or more data signals within the one or more wireless charging signals; distributing the power within the wireless charging signals to a display device of the user interface device; extracting the one or more data signals encoded within the wireless charging signals; displaying at least one of an image or an indicator on the display device based on the one or more extracted data signals; and transmitting one or more wireless control signals from the user interface device to the control unit, wherein the one or more wireless control signals are configured to selectively adjust one or more characteristics of one or more external devices coupled to the control unit.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
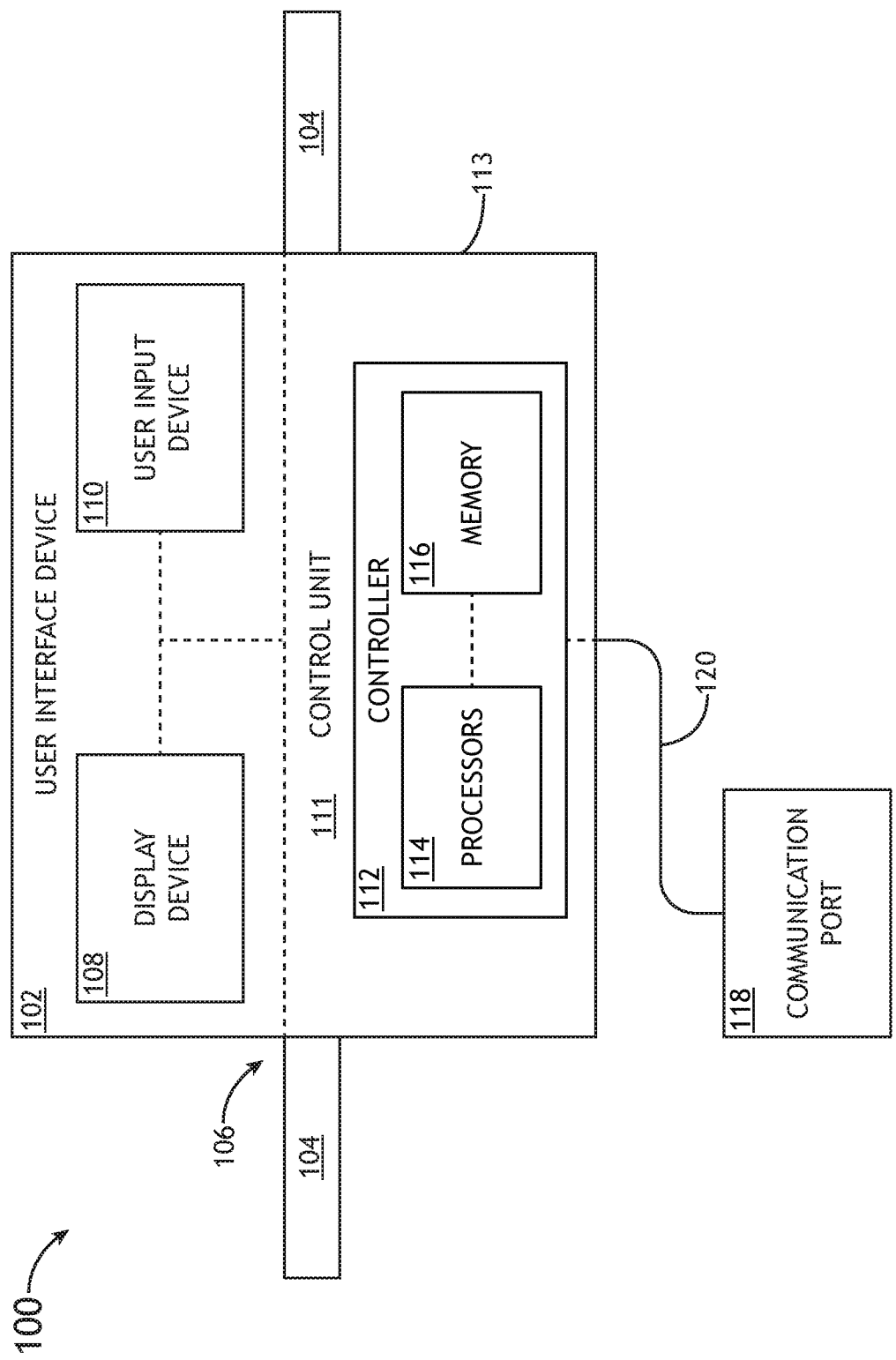
FIG. 1 illustrates a simplified cross-sectional view of an aircraft cabin control panel.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Modern aircraft cabins include a number of control panels configured to control various aspects of the aircraft cabin, including lights, flight attendant controls, passenger entertainment units, passenger environment control units (e.g., air nozzles), and the like. Typically, these control panels are disposed on/within bulkheads of the aircraft cabin, which require holes to be cut within the bulkheads in order for the various wires, cables, and controllers of the control panels to be disposed and/or routed through the bulkhead. However, many aircraft include bulkheads made of expensive materials and/or elaborate woodwork. This is especially the case in private jets and first-class commercial cabins. In this context, cutting holes within the bulkheads to provide for these control panels may destroy portions of the bulkheads, and reduce aesthetic appeal of the aircraft cabin.

Accordingly, embodiments of the present disclosure are directed to a system and method which cure one or more of the shortfalls of the previous approaches identified above. Embodiments of the present disclosure are directed to a wireless aircraft cabin control panel. The wireless aircraft cabin control panel may be configured to transfer power and/or data across a bulkhead of an aircraft cabin without requiring holes to be cut within the bulkhead. Additional embodiments of the present disclosure are directed to a user interface panel and a control unit of a wireless aircraft cabin control panel which are configured for bi-directional communication via wireless communication protocols, including inductive coupling.

It is contemplated herein that embodiments of the present disclosure may enable the implementation of aircraft cabin control panels without necessitating for holes or punctures to be made within the bulkheads of the aircraft cabin. By preventing the need for holes to be cut within the aircraft cabin bulkheads, embodiments of the present disclosure may preserve the aesthetic appeal of the aircraft cabin, prevent destruction to the aircraft cabin itself, and preserve the ability for iterations of user interface devices to be utilized within the aircraft cabin without requiring subsequent user interface devices to conform to pre-cut holes within the bulkheads.

Figure 2:
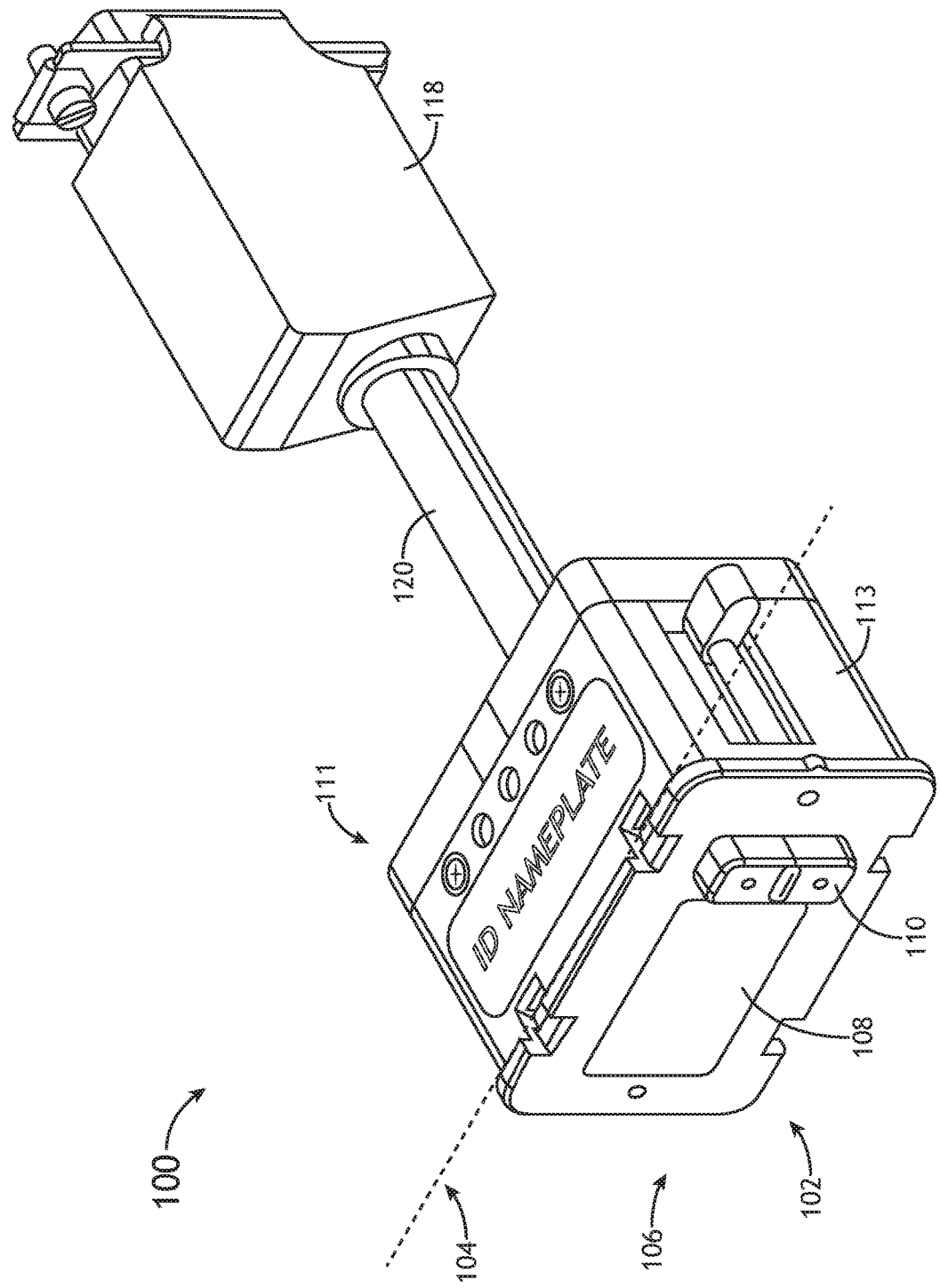
FIG. 2 illustrates a perspective view of an aircraft cabin control panel.

FIG. 1 illustrates a simplified cross-sectional view of an aircraft cabin control panel 100. FIG. 2 illustrates a perspective view of the aircraft cabin control panel 100. In particular, the aircraft cabin control panel 100 depicted in FIGS. 1-2 are provided as an example of a conventional aircraft cabin control panel. It is contemplated herein that a brief description of aircraft cabin control panel 100 may provide a reference point against which attendant advantages of the present disclosure may be compared.

The aircraft cabin control panel 100 may include a user interface device 102 and a control unit 111. The user interface device 102 and the control unit 111 may be stored/contained within a single housing 113, as shown in FIG. 1. Additionally and/or alternatively, the user interface device 102 and the control unit 111 may be stored/contained within separate housings 113.

As noted previously herein, the aircraft cabin control panel 100 may be disposed on/within a bulkhead 104 of an aircraft cabin. For example, the user interface device 102 and/or control unit 111 (e.g., housing 113) may be disposed within one or more holes 106 cut into the bulkhead 104. For instance, as shown in FIG. 1, the housing 113 may be disposed within the hole 106 of the bulkhead 104 such that the user interface device 102 is accessible from a first surface of the bulkhead 104, and the control unit is disposed on/within a second surface opposite the first surface. In this example, the user interface device 102 may be disposed on an exterior surface (first surface) of the bulkhead 104 such that it is accessible by aircraft passengers/personnel, and the control unit 111 may be disposed on/within an interior surface (second surface) of the bulkhead 104 such that the control unit 111 is stowed behind/within the bulkhead 104 itself.

For the purposes of the present disclosure, a bulkhead 104 may be regarded as any wall, partition, or divider configured to sub-divide portions of the aircraft cabin. In this regard, the bulkhead 104 may be regarded as an exterior wall of the aircraft cabin, a partition wall dividing up classes within a commercial aircraft, a partition wall separating passenger seating areas from galley and/or lavatory areas, and the like.

The user interface device 102 may include a display device 108 and a user input device 110. The display device 108 may be configured to display images, indicators, and the like to a user (e.g., aircraft passenger, aircraft personnel). The display device 108 may include light-emitting diode (LED) display, a touchscreen display, an in-flight entertainment display, and the like. The user input device 110 may be configured to receive input commands from a user, wherein the input commands are configured to adjust one or more characteristics of the aircraft cabin control panel 100 and/or external devices coupled to the aircraft cabin control panel 100. The user input device 110 may include buttons, scroll wheels, knobs, touchscreens, levers, switches, and the like.

The control unit 111 may include a controller 112 communicatively coupled to the display device 108 and the user input device 110. The controller 112 is typically coupled to the display device 108 and the user input device 110 via one or more wired communication lines, wherein the wired communication lines are routed within the housing 113 and/or through the one or more holes 106 deposed within the bulkhead 104. The controller 112 may include one or more processors 114 and a memory 116. The one or more processors 114 may be configured to carry out the various steps and functionality of the aircraft cabin control panel 100.

The controller 112 may be further communicatively coupled to one or more communication ports 118 via one or more communication lines 120. The one or more communication ports 118 may include any port or other communicative coupling configured to communicatively couple the controller 112 to one or more external devices of the aircraft cabin. For example, the communication ports 118 may communicatively couple the controller 112 to an aircraft passenger control unit (e.g., aircraft passenger light, aircraft passenger air flow unit), an aircraft personnel device (e.g., flight attendant call device, flight attendant user interface), in-flight entertainment systems, and the like.

In this regard, the aircraft cabin control panel 100 may serve as a means for a user (e.g., aircraft passenger, aircraft personnel) to interact with various components within the aircraft cabin. For example, a user interacting with the user interface device 102 may be able to perform a number of functions including, but not limited to, viewing and/or adjusting the operational state of their personal light (e.g., adjust the light between an "on" state and a "off" state), viewing and/or adjusting a temperature and/or flow rate of their personal passenger air flow unit, activating and/or deactivating an in-flight entertainment unit, calling for aircraft personnel assistance, and the like.

However, as noted previously herein, the conventional aircraft cabin control panel 100 requires one or more holes 106 to be cut within the bulkhead 104 in order to provide for the housing 113 and/or wires/cables communicatively coupling the various components of the aircraft cabin control panel 100. These holes 106 thereby cause damage to the bulkhead 104, and reduce the overall aesthetic appeal of the aircraft cabin. Accordingly, embodiments of the present disclosure are directed to a wireless aircraft passenger control panel which cures one or more of the shortfalls of the aircraft cabin control panel 100 described above.

Figure 3:
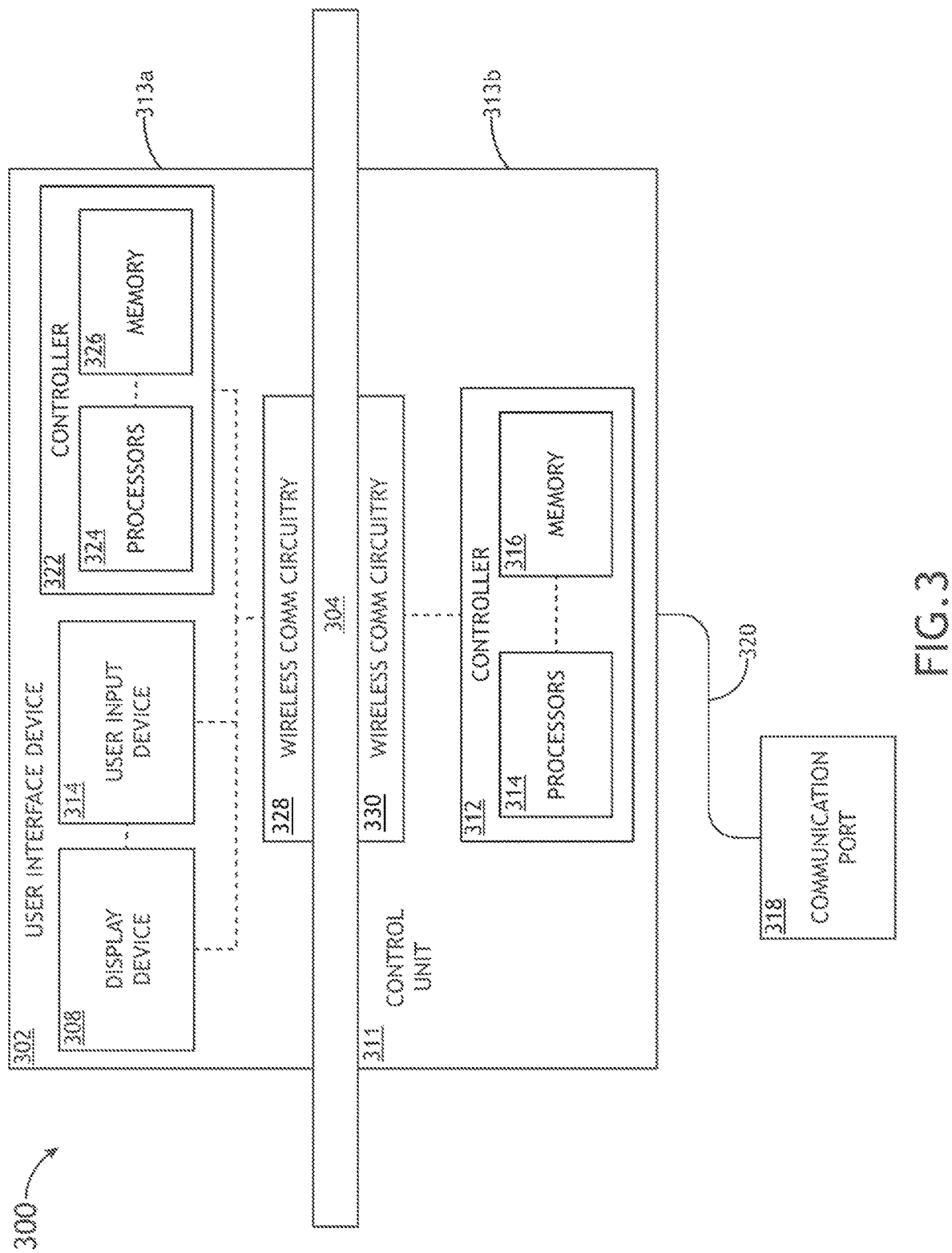
FIG. 3 illustrates a simplified cross-sectional view of a wireless aircraft cabin control panel, in accordance with one or more embodiments of the present disclosure.

FIG. 3 illustrates a simplified cross-sectional view of a wireless aircraft cabin control panel 300, in accordance with one or more embodiments of the present disclosure. The wireless aircraft cabin control panel 300 may include, but is not limited to, a user interface device 302, a control unit 311, and one or more communication ports 318. It is noted herein that any discussion associated with the aircraft cabin control panel 100 in FIGS. 1-2 may be regarded as applying to the wireless aircraft cabin control panel 300, to the extent applicable, and unless noted otherwise.

In embodiments, the user interface device 302 may include a display device 308, a user input device 310, a controller 322 including one or more processors 324 and memory 326, and wireless communication circuitry 328. Similarly, the control unit 311 may include, but is not limited to, wireless communication circuitry 330, a controller 312 including one or more processors 314 and memory 316.

In embodiments, the user interface device 302 is disposed on a first surface of a bulkhead 104 of an aircraft cabin. For example, as shown in FIG. 3, the user interface device 302 may be disposed on an exterior surface (first surface) of a bulkhead 104 such that the various components of the user interface device 302 are viewable and/or accessible by a user (e.g., aircraft passenger, aircraft personnel). In embodiments, the user interface device 302 may be disposed within a housing 313a mounted or coupled to the bulkhead 304 using any techniques known in the art including, but not limited to, adhesives, brackets, mechanical fasteners (e.g., bolts, screws, pins, rivets), interlocking assemblies, magnetic adhesion, and the like.

The display device 308 may include any display device known in the art configured to display information of the wireless aircraft cabin control panel 300 and/or aircraft cabin known in the art. For example, the display device 308 may include, but is not limited to, one or more liquid crystal display (LCD), one or more organic light-emitting diode (OLED) based displays, one or more CRT displays, one or more touchscreen displays, one or more in-flight entertainment displays, and the like.

In another embodiment, a user may input commands, selections, and/or instructions responsive to data displayed to the user via the display device 308. In this regard, the user input device 310 may include any input device known in the art configured to receive input commands from a user including, but not limited to, touchscreens, buttons, dials, scroll wheels, switches, levers, and the like. Those skilled in the art should recognize that any input device capable of integration with a user interface device 302 and/or display device 308 is suitable for implementation in the present disclosure.

As shown in FIG. 3, the control unit 311 may be disposed on an opposite surface of the bulkhead 304 as the user interface device 302. For example, the user interface device 302 may be disposed a first surface (exterior surface) of the bulkhead 304, wherein the control unit 311 may be disposed on a second surface (interior surface) of the bulkhead 304, wherein the second surface is opposite the first surface. In this regard, the user interface device 302 may be exterior to the bulkhead 304 such that it is accessible by a user, wherein the control unit 311 is disposed within the bulkhead 304 of the aircraft cabin. As shown in FIG. 3, the user interface device 302 and the control unit 311 may be contained within separate housings 313a, 313b.

In embodiments, the various components of the user interface device 302 and the various components of the control unit 311 may be communicatively couplable via the wireless communication circuitry 328 of the user interface device 302 and the wireless communication circuitry 330 of the control unit 311. The wireless communication circuitry 328, 330 may include any communication circuitry or interface known in the art configured to enable wireless communication and/or a wireless coupling. In this regard, the wireless communication circuitry 328, 330 may be wirelessly communicatively couplable to one another via any wireless communication protocol known in the art including, but not limited to, an inductive coupling, WiFi protocols, Bluetooth protocols (e.g., low-power Bluetooth), radio-frequency protocols, and the like.

For example, the wireless communication circuitry 328 of the user interface device 302 and the wireless communication circuitry 330 of the control unit 311 may be communicatively couplable via an inductive coupling. In this example, the wireless communication circuitry 328, 330 may include inductive transceiving coils (e.g., inductive transmission coils, inductive reception coils).

In embodiments, each controller 312, 322 of the wireless aircraft cabin control panel 300 may include one or more processors 314, 324 and a memory 316, 326. The one or more processors 314, 324 may be configured to execute a set of program instructions stored in memory 316, 326, wherein the set of program instructions are configured to cause the one or more processors 314, 324 to carry out the various steps/functions of the present disclosure.

For example, the controller 322 of the user interface device 302 may be configured to: generate one or more control signals configured to cause the wireless communication circuitry 328 to transmit one or more wireless control signals to the wireless communication circuitry 330 of the control unit 311; receive power via wireless charging signals received from the wireless communication circuitry 330 of the control unit 311; distribute power from the wireless charging signals to the display device 308; extract one or more data signals encoded within the wireless charging signals; and transmit one or more control signals to the display device 308 in response to the one or more extracted data signals, the one or more control signals configured to cause the display device 308 to display at least one of an indicator or an image.

Conversely, the controller 312 of the control unit 311 may be configured to: generate one or more control signals configured to cause the wireless communication circuitry 330 of the control unit 311 to inductively transfer power to the wireless communication circuitry 328 of the user interface device 302 via wireless charging signals; encode a first set of one or more data signals within the wireless charging signals; and receive one or more wireless control signals from the wireless communication circuitry 328 of the user interface device 302 and transmit one or more control commands to an external device 319 in response to the one or more wireless control signals.

Each of these various steps/functions carried out by the controller 312, 322 will be addressed in further detail herein.

In embodiments, the controller 312 of the control unit 311 may be configured to cause the wireless communication circuitry 328 of the control unit 311 to transfer/transmit power to the wireless communication circuitry 330 of the user interface device 302. For example, the controller 322 may be configured to generate one or more control signals configured to cause the wireless communication circuitry 330 to transfer/transmit power to the wireless communication circuitry 328 via wireless charging signals. Conversely, the controller 322 of the user interface device 302 may be configured to receive the transferred power and/or wireless charging signals via the wireless communication circuitry 328. It is noted herein that the controller 312 may be communicatively coupled to the wireless communication circuitry 330 via any communication protocol known in the art including, but not limited to, I2C, a serial peripheral interface (SPI) bus, or the like.

It is noted herein that power may be transferred/transmitted from the control unit 311 through the bulkhead 304 to the user interface device 302 using any wireless coupling known in the art. For example, power may be inductively transferred through the bulkhead 304 via wireless charging signals from the wireless communication circuitry 330 of the control unit 311 to the wireless communication circuitry 328 of the user interface device 302. In the case of inductive coupling, the wireless communication circuitry 328, 330 may include any inductive coupling circuitry or components known in the art including, but not limited to, inductive transceiving coils.

In embodiments, the control unit 311 may be coupled to one or more power sources, and may be configured to transfer/transmit power to the various components of the user interface device 302 via the wireless communication circuitry 328, 330. For example, the control unit 311 (e.g., controller 312, wireless communication circuitry 330) may be coupled to a battery and/or another power source onboard an aircraft. Subsequently, the controller 312 may cause the wireless communication circuitry 328 of the control unit 311 to inductively transfer power to the wireless communication circuitry 330 of the user interface device 302 via wireless charging signals.

The controller 322 of the user interface device 302 may be configured to receive the power transferred/transmitted from the control unit 311, and distribute the power to the various components of the user interface device 302. In this regard, the power provided to the user interface device 302 via the wireless charging signals (e.g., inductive coupling) may be used to power the various components of the user interface device 302 including, but not limited to, the controller 322, the display device 308, and/or the user input device 310.

In some embodiments, the user interface device 302 may further include power supply circuitry configured to distribute power received via the wireless charging signals to the various components of the user interface device 302. For example, the user interface device 302 may include power supply circuitry electrically couplable to the wireless communication circuitry 328, controller 322, display device 308, and/or user input device 310, wherein the power supply circuitry is configured to distribute electrical power throughout the user interface device 302. The power supply circuitry may include any power supply components known in the art including, but not limited to, electrical lines (e.g., wires, cables), batteries (e.g., rechargeable batteries), capacitors, and the like. For example, the power supply circuitry may include one or more rechargeable batteries configured to store power received via the wireless charging signals from the control unit 311. In this example, the rechargeable batteries may be configured to power the various components of the user interface device 302 in the event the wireless charging signals (e.g., inductive coupling) between the user interface device 302 and the control unit 311 are blocked or interrupted.

In embodiments, the controller 312 of the control unit 311 may be further configured to encode one or more data signals within the wireless charging signals. The controller 312 may be configured to encode one or more data signals within the wireless charging signals (e.g., within the inductive coupling) via any modulation technique known in the art including, but not limited to, phase-shift keying (PSK), binary phase-shift keying (BPSK), quadrature phase shift keying (QPSK), frequency-shift keying (FSK), amplitude-shift keying (ASK), and the like.

The one or more data signals encoded within the wireless charging signals may include any data known in the art which may be utilized by the various components of the user interface device 302. For example, the one or more data signals encoded within the wireless charging signals (e.g., within the inductive coupling) may include data associated with one or more images/indicators to be displayed via the display device 308. By way of another example, the one or more data signals encoded within the wireless charging signals (e.g., within the inductive coupling) may include data indicative of various characteristics of the wireless aircraft cabin control panel 300 and/or components of the aircraft cabin. For instance, the one or more data signals may include data indicative of an operational state of a personal light (e.g., "on" operational state, "off" operational state), data indicative of a temperature and/or flow rate of their personal passenger air flow unit, and the like. Generally speaking, the one or more data signals may include any data which may be of particular interest to a user (e.g., aircraft passenger, aircraft personnel) within an aircraft cabin.

The controller 322 of the user interface device 302 may be configured to extract the one or more data signals encoded within the wireless charging signals (e.g., within the inductive coupling). The controller 322 may be configured to store the extracted data in memory 326. In embodiments, the controller 322 may be configured to generate one or more control signals in response to the extracted data/extracted data signals. For example, the one or more data signals encoded within the wireless charging signals may include data associated with one or more images which are to be displayed to a user via the display device 308. In this example, the controller 322 may be configured to extract the data signals from the wireless charging signals, and transmit one or more control signals to the display device 308 in response to the extracted data signals, wherein the one or more control signals are configured to cause the display device 308 to display the one or more images associated with the extracted data signals.

In some embodiments, the wireless aircraft cabin control panel 300 may be configured for bi-directional communication/control between the user interface device 302 and the control unit 311. Accordingly, in addition to the wireless charging signals (power) and encoded data signals transmitted from the control unit 311 to the user interface device 302, the wireless aircraft cabin control panel 300 may be configured to transmit one or more control signals from the user interface device 302 to the control unit 311.

For example, the controller 322 of the user interface device 302 may be configured to generate one or more control signals configured to cause the wireless communication circuitry 328 to transmit one or more wireless control signals through the bulkhead 304 to the wireless communication circuitry 330 of a control unit 311. The wireless control signals may be transmitted from the wireless communication circuitry 328 of the user interface device 302 to the wireless communication circuitry 330 of the control unit 311 via any wireless communication protocol known in the art. For example, in some embodiments, the one or more wireless control signals may be transmitted from the user interface device 302 to the control unit 311 via an inductive coupling. By way of another example, the one or more wireless control signals may be transmitted from the user interface device 302 to the control unit 311 via WiFi signals, Bluetooth signals (e.g., low-power Bluetooth signals), and the like.

It is noted herein that the wireless control signals transmitted from the user interface device 302 to the control unit 311 may allow a user to selectively control or adjust various components of the wireless aircraft cabin control panel 300 and/or other components (e.g., external devices 319) of the aircraft cabin. In this regard, the controller 322 may generate the wireless control signals in response to one or more input commands received from a user via the user input device 310. For example, in the case where the user input device includes a touchscreen, a user may input one or more control commands via the touchscreen (e.g., user input device 310) in order to activate a passenger light or adjust a temperature and/or flow rate of their personal passenger air flow unit (e.g., external device 319). The controller 322 may receive the input commands from the touchscreen (user input device 310) and generate the one or more wireless control signals in response to the input commands.

It is noted herein that the input commands/wireless control signals initiated by a user may be configured to selectively adjust any characteristic or component within the wireless aircraft cabin control panel 300 and/or aircraft cabin. As will be described in further detail herein, components of the aircraft cabin which may be selectively adjusted/controlled by the wireless aircraft cabin control panel 300 may be generally referred to as "external devices 319." In this regard, external devices 319 which may be selectively adjusted/controlled by the wireless aircraft cabin control panel 300 may include, but are not limited to, an aircraft passenger control unit (PCU) (e.g., passenger light, passenger air flow unit), aircraft personnel device (e.g., flight attendant tablet), in-flight entertainment unit, and the like. For instance, a user may use the user input device 310 in order to selectively actuate an in-flight entertainment unit from a stowed position to a deployed position.

The controller 312 of the control unit 311 may be configured to receive the one or more wireless control signals from the user interface device 302 and store data associated with the wireless control signals in memory 316. The controller 312 may then be configured to generate/transmit one or more control commands to an external device 319 (e.g., aircraft passenger control unit (PCU), aircraft personnel device) in response to the one or more wireless control signals.

For example, the wireless aircraft cabin control panel 300 may include one or more communication ports 318 communicatively coupled to the controller 312 via one or more communication lines 120. The one or more communication ports 318 may include any port or other communicative coupling configured to communicatively couple the controller 312 to one or more external devices 319 of the aircraft cabin. For example, the one or more communication ports 318 may be configured to interface with one or more external devices 319 via HDMI interfaces, serial interfaces, Ethernet interfaces, and the like. In this example, the controller 312 may be configured to generate and transmit one or more control commands to the one or more communication ports 318/external devices 319 in response to one or more wireless control signals received from the user interface device 302, wherein the one or more control commands are configured to selectively adjust one or more characteristics of the respective external devices 319.

It is noted herein that the one or more components of wireless aircraft cabin control panel 300 may be communicatively coupled to the various other components of wireless aircraft cabin control panel 300 in any manner known in the art. For example, the one or more components of the user interface device 302 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like). Similarly, the one or more components of the control unit 311 may be communicatively coupled to each other and other components via a wireline (e.g., copper wire, fiber optic cable, and the like) or wireless connection (e.g., RF coupling, IR coupling, data network coupling, WiFi, WiMax, Bluetooth, 3G, 4G, 4G LTE, 5G, and the like).

In one embodiment, the one or more processors 314, 324 may include any one or more processing elements known in the art. In this sense, the one or more processors 314, 324 may include any microprocessor-type device configured to execute software algorithms and/or instructions. In one embodiment, the one or more processors 314, 324 may consist of a computer system, parallel processor, microprocessor, logical device (e.g., field-programmable gate array (FPGA)), or other processing device configured to execute a program configured to operate the wireless aircraft cabin control panel 300, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 314, 324. In general, the term "processor" may be broadly defined to encompass any device having one or more processing elements, which execute program instructions from memory 316, 326. Moreover, different subsystems of the wireless aircraft cabin control panel 300 (e.g., display device 308, user input device 310, wireless communication circuitry 328, 330, communication port 318, external device 319) may include processor or logic elements suitable for carrying out at least a portion of the steps described throughout the present disclosure. Therefore, the above description should not be interpreted as a limitation on the present disclosure but merely an illustration.

The memory 316, 326 may include any storage medium known in the art suitable for storing program instructions executable by the associated one or more processors 314, 324. For example, the memory 316, 326 may include a non-transitory memory medium. For instance, the memory 316, 326 may include, but is not limited to, a read-only memory (ROM), a random-access memory (RAM), a magnetic or optical memory device (e.g., disk), a magnetic tape, a solid-state drive and the like. It is further noted that memory 316, 326 may be housed in a common controller housing with the one or more processors 314, 324. In an alternative embodiment, the memory 316, 326 may be located remotely with respect to the physical location of the processors 314, 324, controller 312, 322, and the like. In another embodiment, the memory 316, 326 maintains program instructions for causing the one or more processors 314, 324 to carry out the various steps described through the present disclosure.

Figure 4:
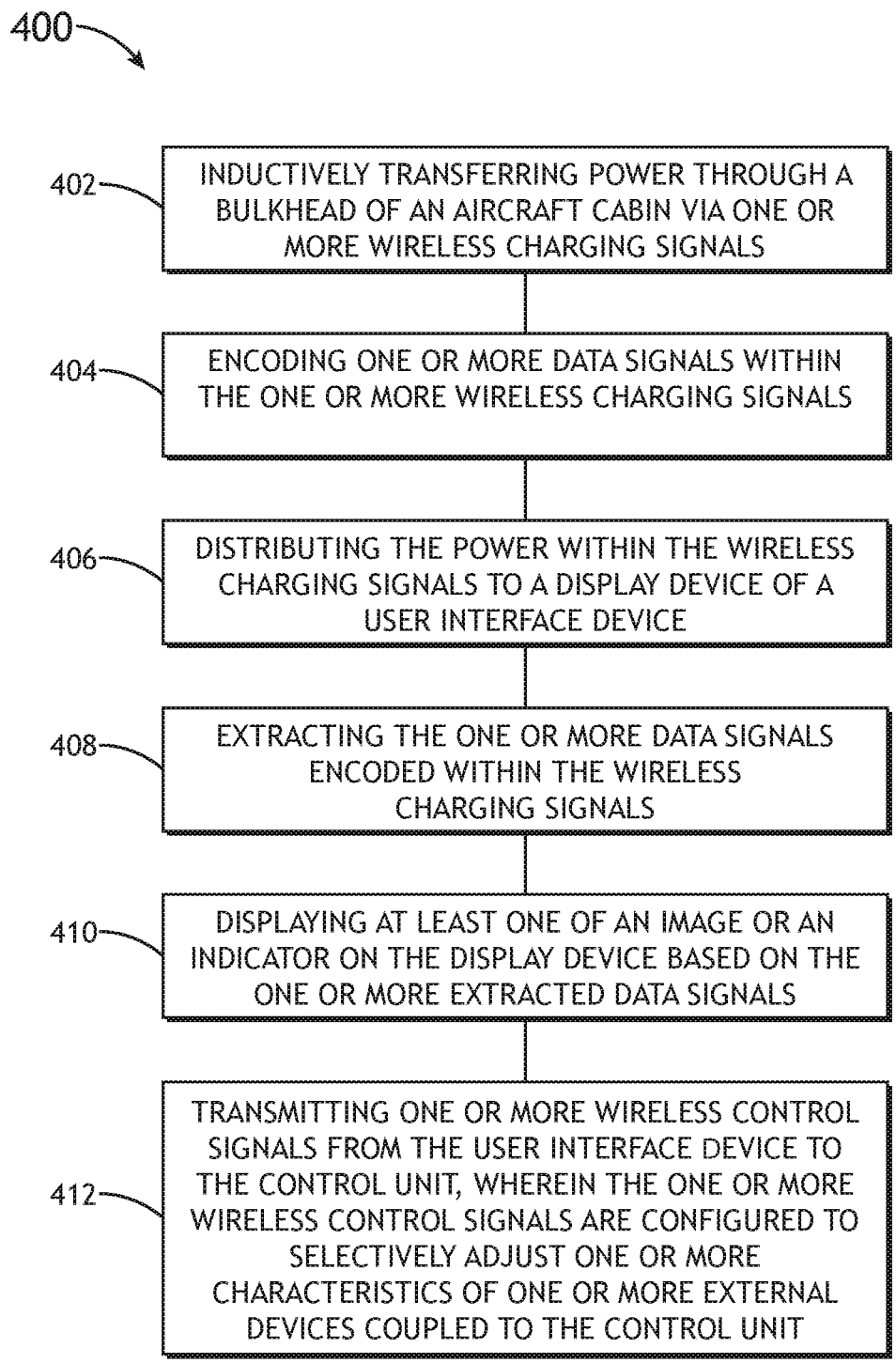
FIG. 4 illustrates a flowchart of a method for operating a wireless aircraft cabin control panel, in accordance with one or more embodiments of the present disclosure.

FIG. 4 illustrates a flowchart of a method 400 for operating a wireless aircraft cabin control panel 300, in accordance with one or more embodiments of the present disclosure. It is noted herein that the steps of method 400 may be implemented all or in part by wireless aircraft cabin control panel 300. It is further recognized, however, that the method 400 is not limited to the wireless aircraft cabin control panel 300 in that additional or alternative system-level embodiments may carry out all or part of the steps of method 400.

In a step 402, power is inductively transferred through a bulkhead of an aircraft cabin to a user interface device via one or more wireless charging signals. For example, as shown in FIG. 3, wireless communication circuitry 328 of a control unit 311 may be configured to inductively transfer power from the control unit 311 through a bulkhead 304 of an aircraft cabin to a user interface device 302 via one or more wireless charging signals.

In a step 404, one or more data signals are encoded within the one or more wireless charging signals. For example, the controller 312 of the control unit 311 may be further configured to encode one or more data signals within the wireless charging signals. The controller 312 may be configured to encode one or more data signals within the wireless charging signals (e.g., within the inductive coupling) via any modulation technique known in the art including, but not limited to, phase-shift keying (PSK), binary phase-shift keying (BPSK), quadrature phase shift keying (QPSK), frequency-shift keying (FSK), amplitude-shift keying (ASK), and the like. The one or more data signals encoded within the wireless charging signals may include any data known in the art which may be utilized by the various components of the user interface device 302.

In a step 406, the power within the wireless charging signals is distributed to a display device of the user interface device. For example, the controller 322 of the user interface device 302 may be configured to receive the power transferred/transmitted from the control unit 311, and distribute the power to the various components of the user interface device 302. In this regard, the power provided to the user interface device 302 via the wireless charging signals (e.g., inductive coupling) may be used to power the various components of the user interface device 302 including, but not limited to, the controller 322, the display device 308, and/or the user input device 310. In some embodiments, the user interface device 302 may further include power supply circuitry configured to distribute power received via the wireless charging signals to the various components of the user interface device 302. The power supply circuitry may include any power supply components known in the art including, but not limited to, electrical lines (e.g., wires, cables), batteries (e.g., rechargeable batteries), capacitors, and the like.

In a step 408, the one or more data signals encoded within the wireless charging signals are extracted. For example, the controller 322 of the user interface device 302 may be configured to extract the one or more data signals encoded within the wireless charging signals (e.g., within the inductive coupling). The controller 322 may be configured to store the extracted data in memory 326.

In a step 410, at least one of an image or an indicator is displayed on the display device 308 based on the one or more extracted data signals. For example, the controller 322 may be configured to generate one or more control signals in response to the extracted data/extracted data signals. For example, the one or more data signals encoded within the wireless charging signals may include data associated with one or more images which are to be displayed to a user via the display device 308. In this example, the controller 322 may be configured to extract the data signals from the wireless charging signals, and transmit one or more control signals to the display device 308 in response to the extracted data signals, wherein the one or more control signals are configured to cause the display device 308 to display the one or more images associated with the extracted data signals.

In a step 412, one or more wireless control signals are transmitted from the user interface device to the control unit, wherein the one or more wireless control signals are configured to selectively adjust one or more characteristics of one or more external devices coupled to the control unit. For example, the controller 322 of the user interface device 302 may be configured to generate one or more control signals configured to cause the wireless communication circuitry to 328 transmit one or more wireless control signals through the bulkhead 304 to the wireless communication circuitry 330 of a control unit 311. For instance, in the case where the user input device includes a touchscreen, a user may input one or more control commands via the touchscreen (e.g., user input device 310) in order to activate a passenger light or adjust a temperature and/or flow rate of their personal passenger air flow unit (e.g., external device 319). The controller 322 may receive the input commands from the touchscreen (user input device 310) and generate the one or more wireless control signals in response to the input commands.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A wireless aircraft cabin control panel, comprising:
    a control unit disposed on a first surface of a bulkhead of an aircraft cabin, the control unit communicatively coupled to one or more external devices aboard the aircraft;
    a user interface device disposed on a second surface of the bulkhead, the second surface opposite the first surface, the user interface comprising:
        a display device;
        a user input device;
        wireless communication circuitry; and
        a controller including one or more processors configured to execute a set of program instructions stored in memory, the set of program instructions configured to cause the one or more processors to:
            generate one or more control signals configured to cause the wireless communication circuitry to transmit one or more wireless control signals to wireless communication circuitry of the control unit, the one or more wireless control signals configured to selectively modify one or more characteristics of the one or more external devices;
            receive power via wireless charging signals received from the wireless communication circuitry of the control unit;
            distribute power from the wireless charging signals to the display device;
            extract one or more data signals encoded within the wireless charging signals, the one or more data signals including data indicative of an operational state of the one or more external devices; and
            transmit one or more control signals to the display device in response to the one or more extracted data signals, the one or more control signals configured to cause the display device to display at least one of an indicator or an image.

2. The wireless aircraft cabin control panel of claim 1, wherein the wireless communication circuitry of the user interface device and the wireless communication circuitry of the control unit are communicatively coupled via an inductive coupling.

3. The wireless aircraft cabin control panel of claim 2, wherein the power is inductively transferred via the wireless charging signals from the wireless communication circuitry of the control unit to the wireless communication circuitry of the user interface device.

4. The wireless aircraft cabin control panel of claim 2, wherein the wireless communication circuitry of the user interface device and the wireless communication circuitry of the control panel comprise inductive transceiving coils.

5. The wireless aircraft cabin control panel of claim 1, wherein the user interface further comprises:
    power supply circuitry electrically coupled to the display device and the controller, wherein the power supply circuitry is configured to distribute the power received via the wireless charging signals to the display device and the controller.

6. The wireless aircraft cabin control panel of claim 5, wherein the power supply circuitry comprises a rechargeable battery configured to store power.

7. The wireless aircraft cabin control panel of claim 1, wherein the controller is configured to generate the one or more control signals configured to cause the wireless communication circuitry to transmit one or more wireless control signals in response to one or more input commands received via the user input device.

8. The wireless aircraft cabin control panel of claim 1, wherein the one or more external devices comprise at least one of an aircraft passenger control unit or an aircraft personnel device.

9. The wireless aircraft cabin control panel of claim 8, wherein the aircraft passenger control unit comprises at least one of a passenger light or a passenger air flow unit.

10. The wireless aircraft cabin control panel of claim 1, wherein the user input device comprises at least one of a touchscreen, a button, a dial, or a switch.

11. The wireless aircraft cabin control panel of claim 1, wherein the one or more wireless control signals transmitted by the wireless communication circuitry of the user interface device via an inductive coupling.

12. The wireless aircraft cabin control panel of claim 1, wherein the one or more wireless control signals transmitted by the wireless communication circuitry of the user interface device comprise at least one of a low-power Bluetooth signal or a WiFi signal.

13. The wireless aircraft cabin control panel of claim 1, wherein the control unit is disposed within the bulkhead of the aircraft cabin.

14. A method for operating a wireless aircraft cabin control panel, comprising:
- inductively transferring power from a control unit of a wireless aircraft cabin control panel through a bulkhead of an aircraft cabin to a user interface device via one or more wireless charging signals, the control unit disposed on a first surface of the bulkhead and the user interface device disposed on a second surface of the bulkhead opposite the first surface;
- encoding one or more data signals within the one or more wireless charging signals;
- distributing the power within the wireless charging signals to a display device of the user interface device;
- extracting the one or more data signals encoded within the wireless charging signals;
- displaying at least one of an image or an indicator on the display device based on the one or more extracted data signals; and
- transmitting one or more wireless control signals from the user interface device to the control unit, wherein the one or more wireless control signals are configured to selectively adjust one or more characteristics of one or more external devices coupled to the control unit.

* * * * *